Aug. 7, 1956 W. F. JAMES 2,758,167
POLE SUPPORTED SWITCHING STATION
Filed Nov. 6, 1953 4 Sheets-Sheet 1

INVENTOR.
WILLIAM F. JAMES
BY
Strauch, Nolan & Diggins
ATTORNEYS

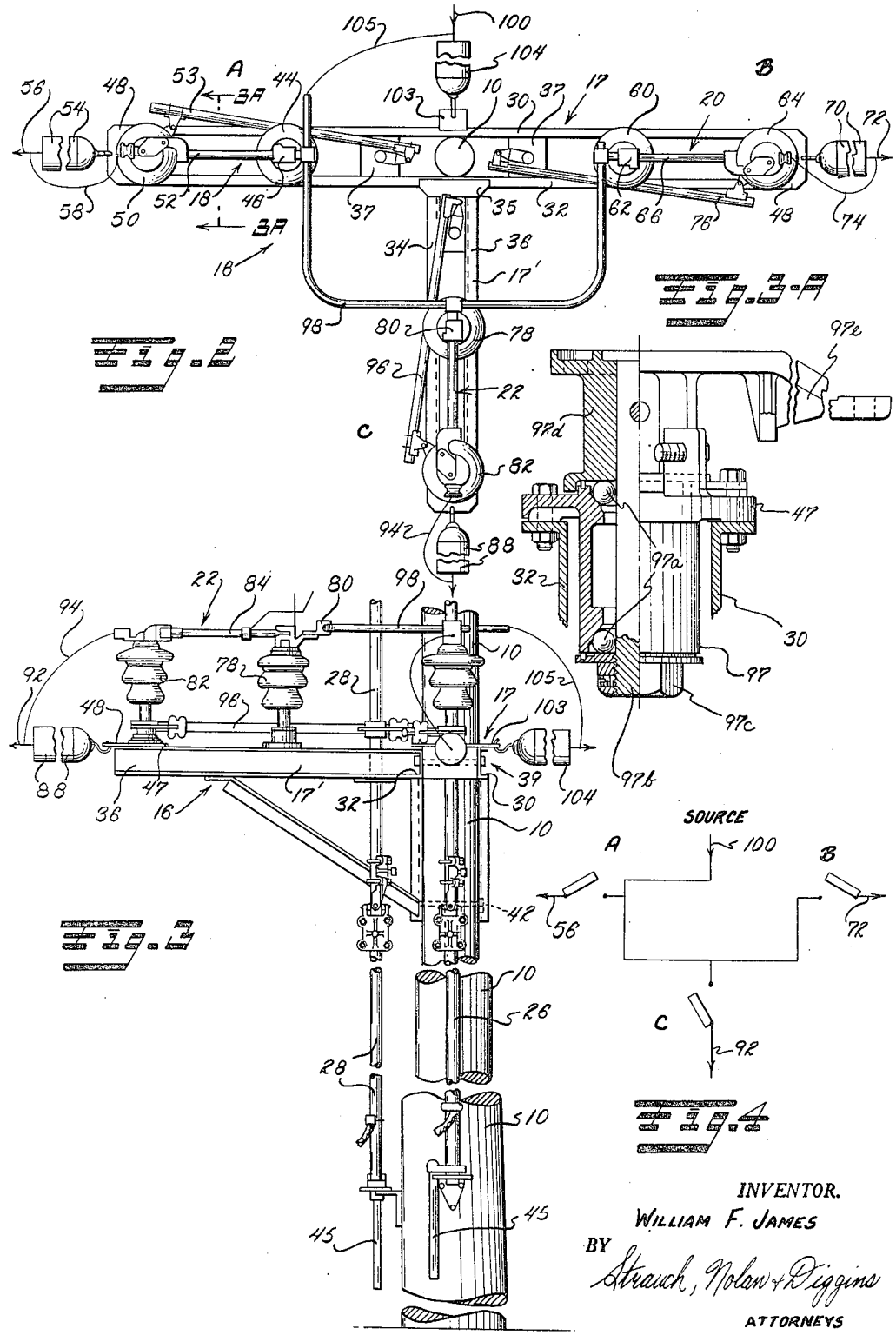

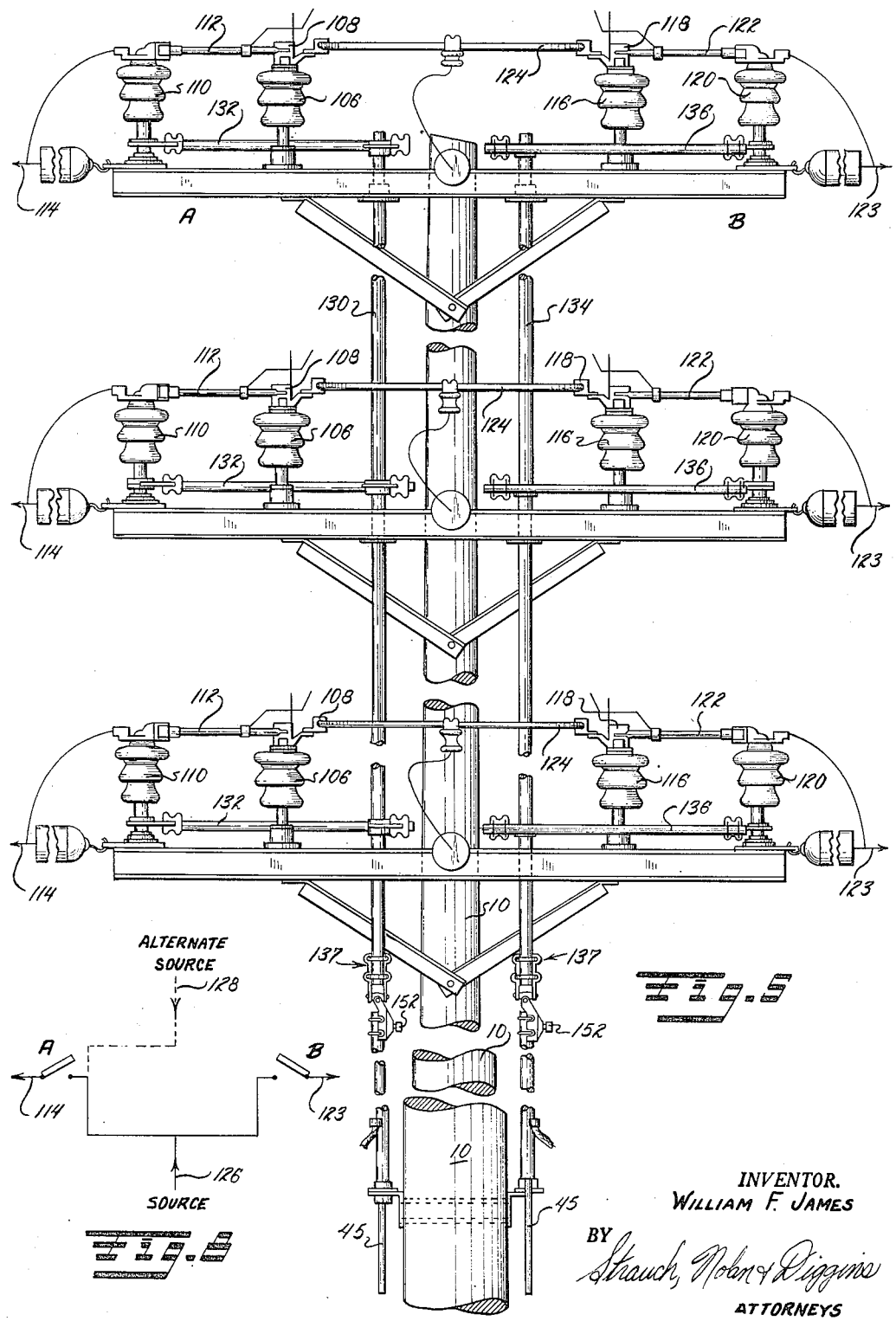

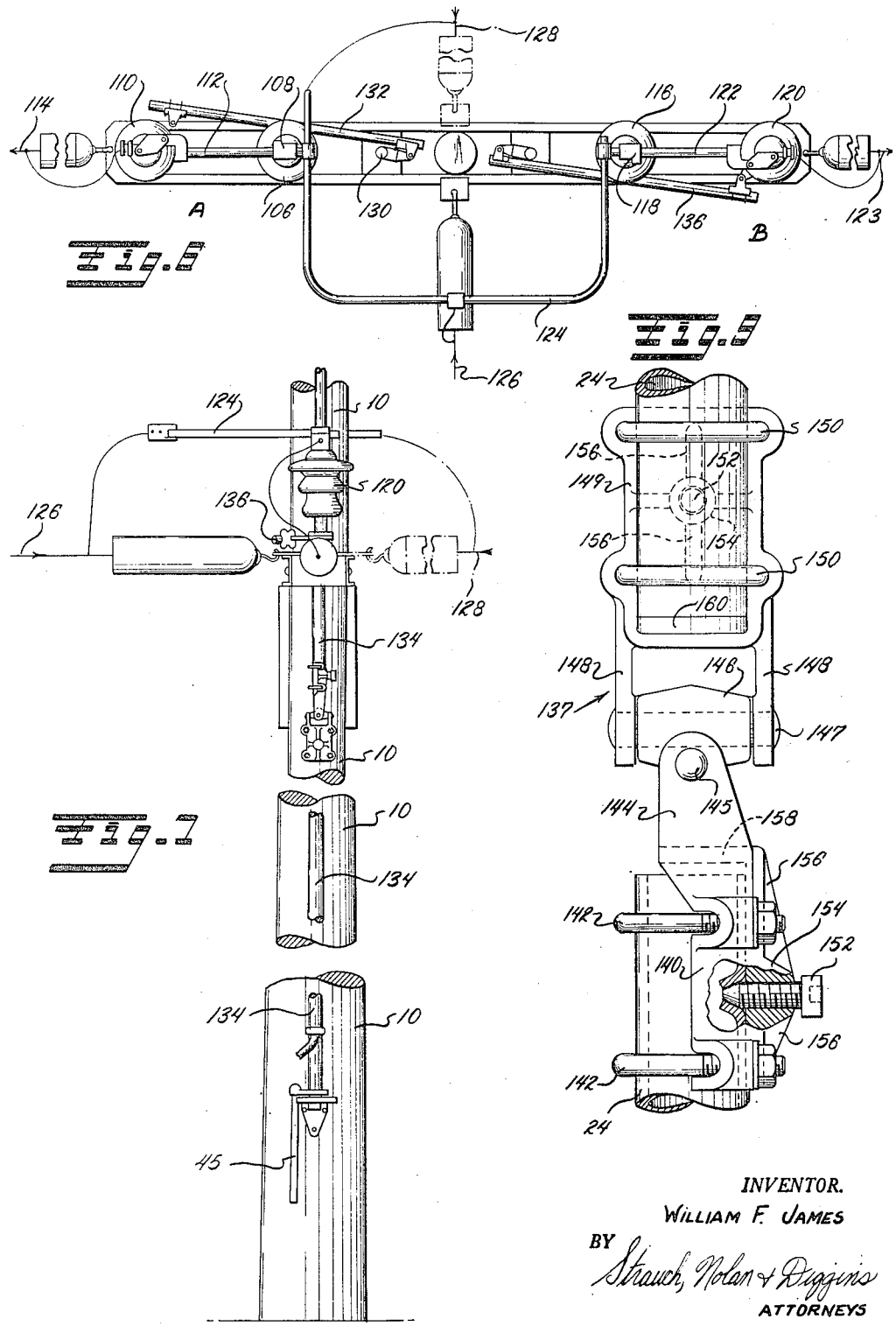

United States Patent Office 2,758,167
Patented Aug. 7, 1956

2,758,167

POLE SUPPORTED SWITCHING STATION

William F. James, Birmingham, Ala., assignor to USCO Power Equipment Corporation, Birmingham, Ala., a corporation of Alabama Application November 6, 1953, Serial No. 390,493

7 Claims. (Cl. 200—48)

This invention relates to the phase grouping of a plurality of switches of each phase of a polyphase transmission line to provide a switching station on a pole, or other support, so that a primary or first feeder line may be connected at will to selected branch or feeder lines by simple and economical means.

Reference is made to the Patent 2,470,576 of May 17, 1949, to Pollock et al. as showing a pole supported switching station, and the switching station of the present invention possesses advantages not possible with the station of that patent.

It is an object of this invention to provide a pole supported switching station in which a phase grouping of a plurality of switches provides simple and economical means whereby a primary or first feeder line is connectable to a plurality of branch lines, and is so arranged that any of the switches may be operated without in any way affecting the operability of other switches to connect or disconnect its respective branch line to the primary feeder line.

Still another object of the present invention is to provide a polyphase pole supported switching station wherein a polyphase power line is connected to the stationary contacts of a plurality of switches the movable contacts of which are respectively connected to branch lines or feeders to provide uninterrupted service where such service is of critical importance.

A further object of the present invention is to provide a polyphase pole supported switch station wherein the switch groups and supply power line connections are arranged in respective radiating relation on a single pole to eliminate the need for double pole installations and guy connections to the ground.

Other and further objects of this invention will become apparent from a consideration of the following detailed description taken in connection with the appended claims and accompanying drawings.

In the drawings:

Figure 2 is a plan view of Figure 1.

Figure 3 is a side elevational view of a portion of the structure of Figure 1.

Figure 3A is a detailed sectional view on line 3A—3A of Figure 2 illustrating a preferred mounting for the rotary switch insulator of Figure 1.

Figure 4 is a schematic diagram of the switch connections of Figure 1.

Figure 5 is a view similar to Figure 1 of a modified pole supported, gang operated switch grouping.

Figure 6 is a top plan view of Figure 5.

Figure 7 is a side elevational view of a portion of Figure 5.

Figure 8 is a schematic diagram of the switch connections of Figure 5.

Figure 9 is a plan view of a novel universal clevis useful in this invention.

Figure 1:
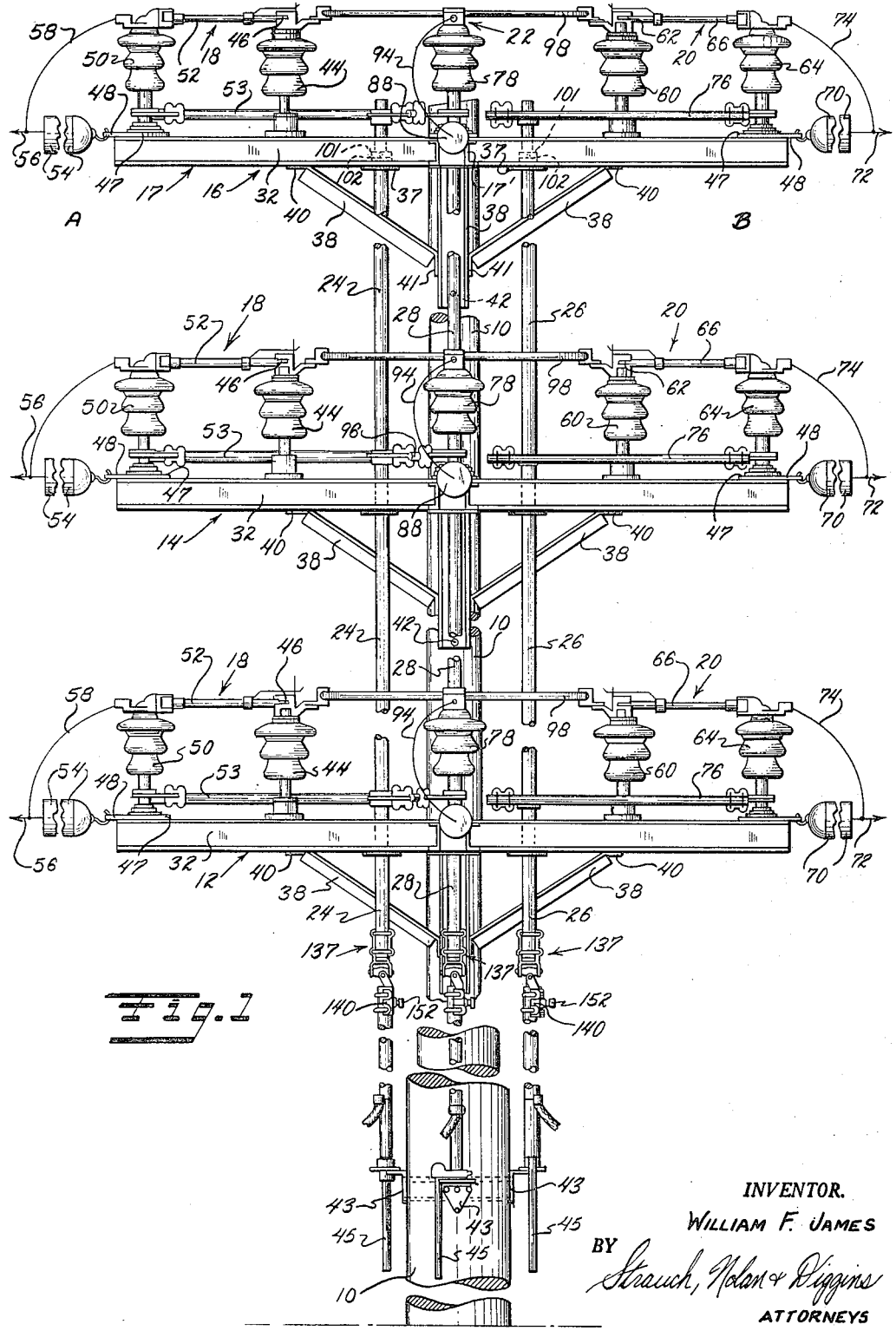
Figure 1 is a front elevation of a pole supported, gang operated switch group for a polyphase transmission line, with parts broken away for clarity of illustration.

With continued reference to the drawings wherein like reference numerals are used throughout to indicate the same parts and with particular reference for the moment to Figure 1, there is shown a switching station for a high voltage three-phase transmission line including three-phase branches or feeders. A ground supported pole 10 carries three vertical spaced frames 12, 14 and 16 respectively. Each phase switch of each branch line are ganged together for simultaneous operation by operating rods 24, 26 and 28 respectively.

Since the details of the frames and switches are similar in each phase grouping, a detailed description of the top phase only will be given here. The cross-arm 17 of the top frame 16 is formed by a pair of shallow channel members 30 and 32 disposed in back-to-back spaced relation to freely straddle pole 10 and connected together by tie plate members 37 and 47 secured to channel members 30 and 32 at spaced intervals to form supports for the switch operating rods and insulator stacks. A through bolt and nut assembly 39 (Figure 3) passing through pole 10 and the midpoint of the webs of channel members 30 and 32 secures frame 16 to pole 10. Frame 16 in the embodiment of Figures 1 to 3 comprises a laterally extending cross-arm 17 and a right angularly disposed arm 17' secured in right angularly aligned relation to the midpoint of the cross-arm. While a single right angularly disposed arm 17' is disclosed in Figures 1 through 3, it will be appreciated that an additional oppositely directed arm 17' may be provided if an additional switch is desired to provide a common disconnect switch between the primary feeder line and the several branches. The arm arrangement just described provides three vertically aligned substantially T-shaped frames each of which supports three angularly related switches 18, 20 and 22 forming the required three phase switch groupings for the three branch lines disclosed. The arm 17' is made up of shallow channel members 34 and 36 connected at one end to members 30 and 32 by gusset plates 35 and tied together at spaced intervals by plate members 37 and 47 like those previously referred to and serving the same purpose.

When finally assembled and mounted on pole 10 each frame structure comprises oppositely directed radiating arms A and B and right angular disposed radiating arm C. Each of these arms is suitably reinforced against downward cantilever forces by respective inverted channel brackets 38 secured to the respective arms by angularly bent securing formations 40 and to pole 10 by similar angularly bent securing formations 41 suitably bolted as indicated at 42 to post 10.

Each of arms A, B and C, as shown most clearly in Figures 1 and 3, has two tie plates 37 and one plate 47 secured thereto. The innermost tie plate 37 of each arm is located quite close to pole 10 on the underside of the channel members and is centrally apertured to respectively journal operating rods 24, 26 and 28, the lower ends of which are journalled in generally L-shaped brackets 43 and provided with suitable crankhandles 45 for turning the operating rods. Suitable collars 101 fixedly secured inwardly from the upper ends of operating rods 24, 26, and 28 and bearing on bearing plates 102 resting on inner tie plates 37 of support frame 16 support the rods in operative position.

Arm A carries a stationary insulator 44, provided with contact jaws 46, intermediate plate 37 connecting the members 30 and 32 serving to support this insulator. Outermost plate 47 adapts arm A to journallingly support a turnable insulator 50 thereon. The insulator 50 carries a switch blade 52 swingable into and out of engagement with the contact jaws 46 as the insulator is turned through conventional linkage means 53 connected to the upper end of operating rod 24 and an arm on the mounting adapter for the turnable insulator 50 hereinafter described.

The outermost plate 47 provides an anchoring extension 48 for an insulator 54, to which a branch line 56 is connected and from which a short flexible lead 58 extends to the contact for blade 52.

Arm B similarly supports a stationary insulator 60 having contact jaws 62 and a turnable insulator 64 which carries the switch blade 66 for engagement with the contact jaws 62. The turnable insulator is mounted on outermost plate 47 which like the previously described outermost plate 47 provides an anchoring extension 48 for an insulator 70. Branch line 72 is connected to insulator 70 and the contact of switch blade 66 by flexible lead 74. The insulator 64 is connected to operating rod 28 through a conventional linkage 76.

Arm C also supports a stationary insulator 78 having contact jaws 80 and a turnable insulator 82 which carries the switch blade 84 for engagement with the contact jaws 80. The insulator 82 is mounted on a plate 47 providing an anchoring extension 48 for an insulator 88 of a branch line or feeder 92 which is connected to the contact of the switch blade 84 by a flexible lead 94. The turnable insulator 82 is connected to operating rod 26 through a conventional linkage means 96.

The intermediate plates 37 of each arm are suitably apertured to receive mounting bolts (not shown) adapted to respectively fixedly mount stationary insulator stacks thereon. The outermost plates 47 of each arm are preferably formed with an integral right angularly disposed boss 97 internally bored to receive ball bearings 97a for freely journalling the lower end of the rotary insulator support posts 97b as clearly seen in Figure 3A. The lower end of post 97b is threaded to receive clamp nut 97c to take up play in the bearing assembly while the upper end non-rotatably mounts an insulator mounting adapter 97d for supporting the rotatable insulators 50, 64 and 82. The arm 97e of adaptor 97d is connected in conventional manner to linkage means 53.

A jumper 98 connects together the contact jaws 46, 62 and 80 and this jumper is in turn connected to a primary or first feeder line 100 anchored to a connector plate plate 103 carried on frame 16 through an insulator 104. Line 100 is connected to the jumper by a flexible lead 105.

In some situations in which it is desired to provide alternate sources of power to a hospital or like user, the present invention readily provides for a switching arrangement as shown in Figures 5 and 6. In this embodiment, arm C is omitted and arm A carries a stationary insulator 106 having contact jaws 108 and a turnable insulator 110 which carries a switch blade 112 for engagement with the contact jaws 108. The switch blade is connected to a branch or feeder line 114 as heretofore described. Arm B carries a stationary insulator 116 having contact jaws 118 and a turnable insulator 120 which carries the switch blade 122 for engagement with the contact jaws 118. The switch blade 122 is connected to a branch feeder line 123 as heretofore described.

A jumper 124 connects the contact jaws 108 and 118 together and to the primary feeder line 126 in the manner heretofore described in connection with feeder line 100. An alternative normally deenergized feeder line 128 is also connected to jumper 124 in a manner similar to feeder line 126 for emergency use.

Turnable insulator 110 is connected to an operating rod 130 through conventional linkage means 132 and insulator 120 is also connected to an operating rod 134 through conventional linkage means 136.

While operating rods 24, 26, 28, 130 and 134 may take any desired form the present invention contemplates inclusion of a universal clevis assembly 137 in series with the operating rods so that they will operate properly even when the switch assembly is mounted on a crooked pole. Such a clevis is shown adjacent lower frame 12 in Figure 1, but it will be understood that it may be inserted anywhere in the operating rod to compensate for misalignment of the ends of the operating rods. This universal clevis assembly is shown more particularly in Figure 9 in which the two sections of an operating rod are held together by clevis assembly 137 comprising a lower clamp portion 140 coupled to one rod section by U bolts 142 and having a pair of upstanding arms 144 apertured to receive a pivot pin 145 of a universal knuckle 146 connected by a right angularly disposed pivot 147 to depending arms 148 of an upper clamp portion 149 connected to the other rod section by U bolts 150.

The upper and lower halves of the clevis assembly are each provided with self-piercing set screws 152 carried by an outstanding boss 154 of metal having reinforcing ribs 156. The inward travel of the ends of the rods are limited by an inturned rib 158 on the lower half and by an inturned rib 160 on the upper half of the assembly.

It will be apparent that in providing the switch contact jaws of the stationary insulators with a jumper which connects all of the contact jaws in parallel to the transmission line 100 there has been provided a switch in which any branch line may be disconnected from the line 100 without in any way affecting the operation of the other branch lines or feeders. For example, referring to Figure 1 and assuming branch or feeder line 72 leads to a hospital or like user of current requiring uninterrupted service it is not necessary to disrupt service over line 72 in order to disconnect service lines 56 and/or 92 to repair any trouble in the latter lines or their switches. On the other hand, assuming feeder line 100 leads to a hospital or like user of current requiring uninterrupted service and that the branch or feeder lines 56, 72 and 92 constitute terminal sections of alternate branch circuits from a source of electrical power, it will be appreciated that the switching arrangement of this application permits ready alternate connection of feeder line 100 to any one of several selected branch lines. Therefore, in event of a failure of any one of the branch lines to supply power to line 100, the failure can be quickly and easily corrected by switching line 100 into circuit relationship with either one of the other two branch lines.

In the arrangement of Figures 5 to 8, still greater benefits insofar as uninterrupted service is considered is obtainable since a shift from the primary incoming supply line 126 to the alternate incoming supply line 128 is also possible to permit repair to the primary line 126.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A single support pole; a frame on said support pole comprising a pair of spaced longitudinally extending members straddling said pole with their opposite ends extending away from opposed sides of said pole; spaced plate elements connecting said members; an insulator mounted turnable on one of said plate elements; a switch arm on said insulator; and a feeder line anchored to said plate and having a connection with said switch arm.

2. A switch arm support for a pole supported switch station comprising a pair of channel members disposed in parallel spaced relation to freely but closely receive a support pole therebetween and having centered bolt apertures adapting said channels for mechanical connection to said pole; tie plates extending between said channel members at spaced intervals at both sides of said support pole; to join said channel members and form them into a unitary support frame; support brackets depending from said unitary support frame in a downward and inward direction toward said support pole and having their inner ends adapted for connection to said support pole; connector brackets mounted at each end of said unitary support frame adapted to mechanically connect an electrical branch line to each end of said unitary support frame; and at least one connector bracket centered with respect to the length of said unitary support frame and connected to a flange face of one of said channel members adapted to mechanically connect an electrical feeder line to said unitary support frame.

3. The switch arm support of claim 2 wherein said tie plates at each side of said vertical plane are three in number and wherein the inner plate is apertured to journal a switch operating rod, the middle plate is apertured to fixedly support a stationary switch insulator stack and the outer plate is provided with a vertically extending journal boss adapted to journal a rotatable switch insulator stack.

4. The combination defined in claim 2 together with a right angularly disposed elongated switch support frame fixedly secured at one end to said unitary support frame in centered relation to said support pole and extending away from the side of said unitary support frame opposite that containing said one connector bracket and having a connector bracket at its free end adapted to mechanically connect a further electrical branch line to said elongated switch suport frame whereby a unitary support frame for supporting switching mechanism for three branch lines is provided.

5. The combination defined in claim 4 wherein said elongated support frame comprises a pair of spaced parallel channel members; tie plates extending between said channel members at spaced points to fixedly join said channel members in predetermined parallel relation; and a support bracket depending from said elongated suport frame in a downward direction inclined toward said pole and having its inner end adapted for connection to said support pole.

6. A single pole three phase switch station arrangement comprising a single ground supported pole having switch support frame means providing three sets of vertically spaced and aligned right angularly disposed support arms radiating outwardly from three sides of said pole; a feeder line connector individual to each set of support arms radiating outwardly from the fourth side of said pole; a phase group of switches mounted on each set of support arms, each said switch comprising a first insulator movably supported on its respective support arm, a second insulator stationarily supported on its respective support arm, switch contact means on each of said second insulators and a switch blade carried by each of said first insulators for swinging movement into and out of engagement with its respective switch contact means; conductor means connecting the switch contact means of each phase group of switches; line connectors carried by the outer free ends of each of said support arms; lead lines individually connected at one end to each of said switch contact means; lead lines individually connected at one end to each of said conductor means adapting each of said conductor means for electrical connection to a respective feeder line of a three phase feeder circuit; and individual feeder lines of three additional three phase feeder circuits respectively non-electrically connected to each of said feeder line connectors and electrically connected to its respective power lead line whereby respective vertically aligned sets of said switch contacts are suitably electrically connected to provide independent three phase feeder line circuits adapted for selective connection to the feeder line circuit provided at the fourth side of said pole and each of said feeder lines is mechanically connected to said pole at a point opposite another feeder line thereby balancing the mechanical forces acting on said pole to tilt it from its initial vertical position thereby eliminating the need for guy wiring.

7. A single pole three phase switch station arrangement comprising a ground supported pole; switch support means carried by said pole and comprising at least three set of vertically spaced and aligned support arms radiating outwardly from three sides of said pole; a phase group of bladed switches mounted on each set of support arms; means mechanically connecting the blades of vertically aligned switches to form a plurality of sets of vertically spaced gang connected switches, each of said switches comprising a first insulator movably supported on its respective support arm, a second insulator stationarily supported on its respective support arm, switch contact means on each of said second insulators and a switch blade carried by each of said first insulators for swinging movement into and out of engagement with its respective switch contact means; conductor means permanently connecting the switch contact means of each phase group of switches to a respective feeder line of a first multi-phase feeder circuit; and means permanently connecting the individual switch blades of each said set of gang connected switches individually to a respective one of the feeder lines of respectively differently multi-phase feeder circuits whereby said first multi-phase feeder circuit may be selectively connected to any one or all of said different multi-phase feeder circuits.

References Cited in the file of this patent
UNITED STATES PATENTS 2,470,576     Pollock et al.             May 17, 1949
2,560,472     Pollock et al.             July 10, 1951